UNITED STATES PATENT OFFICE.

JULIUS THEODOR ALEXANDER SAMES, OF DUSSELDORF, GERMANY.

PROCESS FOR THE REMOVAL OF INERT SUBSTANCES FROM BLOOD-SERUMS, &c.

1,057,673. Specification of Letters Patent. Patented Apr. 1, 1913.

No Drawing. Application filed April 9, 1912. Serial No. 689,593.

*To all whom it may concern:*

Be it known that I, JULIUS THEODOR ALEXANDER SAMES, a citizen of the German Empire, residing at Dusseldorf, Germany, have invented new and useful Improvements in Processes for the Removal of Inert Substances from Blood-Serums, &c., of which the following is a specification.

This invention relates to a process for the removal of inert substances from blood serums, milk or other liquids derived from animals of various kinds and containing anti-substances or bodies of an enzym nature and the invention is directed mainly to the problem of the direct production of sterile and clear solutions of anti-substances poor in albumin. For this purpose it is necessary to remove from the blood serums derived from animals as great a portion as possible of the albumin which is injurious to the foreign human or animal organism when assimilated, and also any subsidiary substances.

The new process consists substantially in treating fresh therapeutic or anti serums, or those which have not yet been preserved or have been again freed from preservative agents, with suitable chemicals which are only slightly dissociated such as weakly acid organic precipitants and heating them, whereby the substances (such as albumin) which do not contain the antitoxin or the anti-substances are precipitated, after which any chemicals still present in excess in the solution which is now poor in albumin but contains the main portion of the anti-substances and can be easily concentrated, are removed by means of suitable compounds in an insoluble form or rendered innocuous, so that clear and sterile concentrated therapeutic and anti serums are obtained. The use of heat simultaneously prevents the formation of jelly-like masses on precipitation, and moreover causes the formation of quickly deposited, close flocculent precipitates which carry down with them any germs that may be present, a solution of the anti-substance which is clear and easily maintained in a sterile condition being so obtained.

In order to obtain precipitates substantially free from antitoxins the serums obtained from horses, or animals of the same family, are preferably made alkaline before being treated. The sterile and clear serum obtained according to the new process contains the greater portion of the antitoxin, but only about 50% of the albumin of the original serum and can be used either direct as a therapeutic serum poor in albumin or, after evaporation *in vacuo*, as a serum containing a very considerably increased amount of immune substances or as a dry serum.

The treatment according to the new process is intended to apply principally to freshly obtained serums, the amount of anti-substances contained in which has not yet diminished by standing or by preservation. Serums preserved by means of phenol or cresol or their derivatives may however also be treated by this process, but the heating must then be omitted or the preservative agents must be removed by repeated extraction with chloroform for example, before applying the process.

An example of the way in which the new process is carried out is described in the following example:—100 cc. of freshly obtained tetanus serum of a strength of 8 and from horse blood are mixed with 150 cc. of sterile distilled water and 1 cc. of 10% sodium carbonate solution, to which about 1% of ammonium carbonate has been added, and heated to from 50 to 60 degrees centigrade for 15 minutes in a glass cylinder fitting into the centrifugal machine. 10 cc. of aluminium acetate solution, of a strength 7.5–8% of basic aluminium acetate are then added drop by drop to the alkaline liquid with stirring whereby a thick, flocculent and readily deposited precipitate, consisting of aluminium hydroxid and horse albumin, is formed and which is allowed to settle before pouring off the now acid liquid containing the antitoxin, then subsequently centrifuged off and neglected. The liquid thus freed from about half of the horse albumin is made faintly alkaline with the above-mentioned alkalizing agent and then evaporated down *in vacuo* at a temperature of from 40 to 50 degrees. When evaporated down to 80 cc. the preparation prepared from the tetanus serum of a strength of 8 is shown by chemical determination to be freed from, roughly, 50% of the albumin. According to biological tests on white mice it was of a strength of $7\frac{1}{2}$ and of a clear bright appearance and perfectly sterile. Owing to the so greatly reduced abumin content further evaporation *in vacuo* for the purpose of increasing the antitoxin content is facilitated and the preparation of dry serum is likewise simpler.

The use of liquid aluminium acetate, which possesses a germicidal action is to be regarded as an advantage of the process. The use of heat and precipitation which carries down any germs with it also effect sterilization, so that the process can also be used as a sterilizing agent for slightly contaminated therapeutic serums. Old preserved serums, which no longer contain the given number of antitoxin units, can also be regenerated and intensified again.

Instead of aluminium salts other metallic compounds may also be used for the precipitation of the albumin from horse blood serum. In addition to being used for blood serums obtained from horses or animals of the same family, such as the mule or hinny, the new process may also be used in an expressly modified form for blood serums from other kinds of animals such as monkeys, oxen, sheep, goats, pigs, rabbits, guinea-pigs, &c., which contain reaction products on toxins and infections, &c., such as lysins, precipitins, agglutinins, complement forming anti-substances, enzyms and similar substances. It is not always necessary in this process to obtain precipitation by metallic hydroxid precipitates produced in a colloidal form, on the contrary, other chemicals may also be used for precipitation such as acetic acid or other innocuous organic acids for ox blood serum for example. Finally milk or other liquids derived from animals and containing anti-substances or substances of an enzym nature may also be treated by the new process.

When those albumin substances which are distinguished by coarse flocculent precipitation and thereby indicate that they do not contain the anti-substances have been removed by the new process, the albumin which contains the anti-substance can obviously also be separated by a further application of the process. In this case, however, the precipitation is not coarsely flocculent but finely flocculent.

In the use of the new process in science it is advisable to determine first with small quantities of serum with what quantities of the added chemicals the most advantageous action is obtained for the particular serum under treatment.

Claims—

1. Process for the removal of inert substances from liquids derived from animal bodies and containing anti-substances, toxins and similar bodies, and providing directly sterile and clear solutions of such anti-substances, which comprises treating the same with a sufficient amount of a weakly acid organic precipitant to precipitate substantially all and only the portion of the albumin of said liquids not containing the active principle.

2. Process for the regeneration of, and the removal of inert substances from, liquids derived from animal bodies and containing anti-substances, toxins and similar bodies, and providing directly sterile and clear solutions of such anti-substances, which comprises removing the preservative from the liquids; heating said liquids; and treating the same with a sufficient amount of a suitable organic precipitant to precipitate substantially all and only the portion of the albumin of said liquids not containing the active principle.

3. Process for the removal of inert substances from liquids derived from animal bodies and containing anti-substances, toxins and similar bodies, and providing directly sterile and clear solutions of such anti-substances, which comprises adding an alkaline reagent thereto; and treating with a sufficient amount of a salt of a metal forming insoluble hydroxids to precipitate substantially all and only the portion of the albumin of said liquids not containing the active principles.

4. Process for the removal of inert substances from liquids derived from animal bodies and containing anti-substances, toxins and similar bodies, and providing directly sterile and clear solutions of such anti-substances, which comprises adding a carbonate of an alkali and treating with a sufficient amount of a salt of a metal forming insoluble hydroxids to precipitate substantially all and only the portion of the albumin of said liquids not containing the active principles.

5. Process for the removal of inert substances from liquids derived from animal bodies and containing anti-substances, toxins and similar bodies, and providing directly sterile and clear solutions of such anti-substances, which comprises adding a carbonate of an alkali; and treating with a sufficient amount of an aluminium salt to precipitate substantially all and only the portion of the albumin of said liquids not containing the active principles.

6. Process for the removal of inert substances from liquids derived from animal bodies and containing anti-substances, toxins and similar bodies, and providing directly sterile and clear solutions of such anti-substances, which comprises adding a carbonate of an alkali; treating with a sufficient amount of an aluminium salt to precipitate substantially all and only the portion of the albumin of said liquids not containing the active principles; and finally adding a carbonate of an alkali and carbonate of ammonium for the purpose of separating insoluble aluminium compounds.

7. Process for the removal of inert substances from tetanus serum, of a strength of 8 and obtained from horse blood, which consists in adding to 100 cc. of such serum mixed with 150 cc. of sterile, distilled water, 1 cc. of 10% sodium carbonate solution, to which about 1% of ammonium carbonate has been added, heating the same for fifteen minutes from 50° C. to 60° C., then adding thereto 10 cc. of aluminium acetate solution, and removing the precipitate formed thereby, and finally rendering the solution faintly alkaline.

In witness whereof I have hereunto set my hand in presence of two witnesses.

JULIUS THEODOR ALEXANDER SAMES. [L. S.]

Witnesses:
   HELEN NUFER,
   ALBERT NUFER.

Copies of this patent may be obtained for five cents each, by addressing the "Commissioner of Patents, Washington, D. C."